(12) United States Patent
Michielsen et al.

(10) Patent No.: US 12,709,058 B2
(45) Date of Patent: Aug. 18, 2026

(54) METHOD AND SYSTEM FOR CONTROLLING AN EXTRUSION SYSTEM FOR ADDITIVE MANUFACTURING

(71) Applicant: VITO NV, Mol (BE)

(72) Inventors: Bart Michielsen, Mol (BE); Jasper Lefevere, Mol (BE)

(73) Assignee: VITO NV, Mol (BE)

( * ) Notice: Subject to any disclaimer, the term of this patent is extended or adjusted under 35 U.S.C. 154(b) by 462 days.

(21) Appl. No.: 18/037,952

(22) PCT Filed: Nov. 19, 2021

(86) PCT No.: PCT/EP2021/082278
§ 371 (c)(1), (2) Date: May 19, 2023

(87) PCT Pub. No.: WO2022/106608
PCT Pub. Date: May 27, 2022

(65) Prior Publication Data

US 2024/0001608 A1 Jan. 4, 2024

(30) Foreign Application Priority Data

Nov. 20, 2020 (EP) ..................................... 20209026

(51) Int. Cl.
*B29C 64/182* (2017.01)
*B29C 64/118* (2017.01)
(Continued)

(52) U.S. Cl.
CPC .......... *B29C 64/182* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS

2016/0067920 A1* 3/2016 Fontaine ............... B29C 64/106 264/255
2017/0031639 A1 2/2017 Cudak et al.
(Continued)

FOREIGN PATENT DOCUMENTS

CN 109895390 A 6/2019

OTHER PUBLICATIONS

Marlin, "G12—Clean the Nozzle", Marlin GCode, version 1.1.0, May 4, 2017, <URL: https://marlinfw.org/docs/gcode/G012.html>, retrieved Feb. 2, 2026 (Year: 2017).*
(Continued)

*Primary Examiner* — Christopher J Fibbi
(74) *Attorney, Agent, or Firm* — Bond, Schoeneck & King, PLLC

(57) ABSTRACT

A method and system for controlling an extrusion system (1) having a plurality of nozzle heads (7) for depositing a predetermined interconnected arrangement for concurrently forming individual three-dimensional structures (3) in parallel. An operation of each of the plurality of nozzle heads is monitored in order to detect failing nozzle heads, wherein a first value is calculated which is indicative of an average print time for finishing a number of three-dimensional structures when the print job is continued using one or more non-failing nozzle heads of the plurality of nozzle heads which are still operational, and a second value is calculated indicative of an average print time for finishing the number of three-dimensional structures when the print job is promptly interrupted and a new print job is initiated with the one or more failing nozzle heads of the plurality of nozzles heads being repaired. The controller is configured to restart the print job with the one or more failing nozzle heads being repaired, when the second value is smaller than the first value.

20 Claims, 3 Drawing Sheets

(51) Int. Cl.
*B29C 64/209* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............. *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2019/0118258 | A1* | 4/2019 | Sachs | B29C 64/393 |
| 2019/0212950 | A1 | 7/2019 | Schloesser et al. | |
| 2020/0198234 | A1* | 6/2020 | Kuster | B29C 64/393 |
| 2020/0326683 | A1* | 10/2020 | Oligschlaeger | G06F 21/608 |
| 2022/0072799 | A1* | 3/2022 | Sultan | B29C 64/35 |
| 2022/0203617 | A1* | 6/2022 | Pekic | B29C 64/30 |
| 2023/0166452 | A1* | 6/2023 | Decrop | B29C 64/386<br>700/100 |

OTHER PUBLICATIONS

International Search Report and Written Opinion—PCT/NL2021/082278—mailing date May 27, 2022.

* cited by examiner

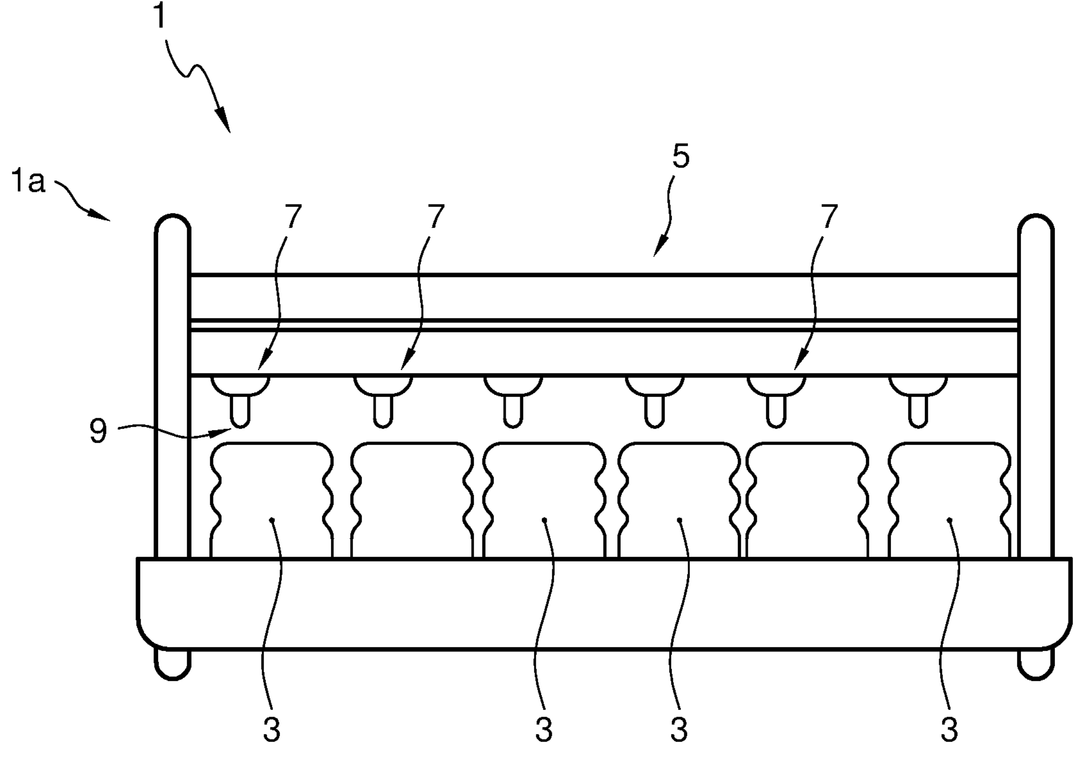
FIG. 1
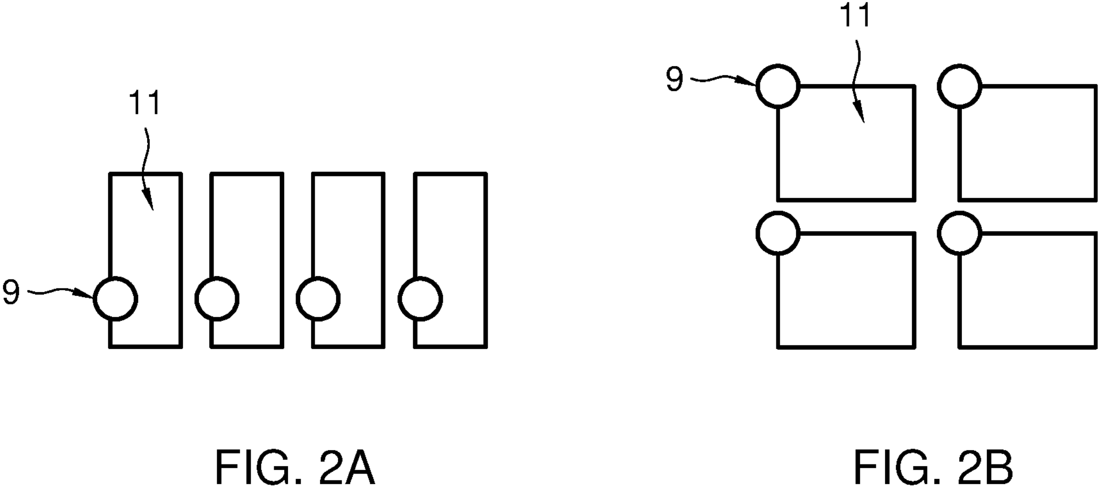
FIG. 2A
FIG. 2B

METHOD AND SYSTEM FOR CONTROLLING AN EXTRUSION SYSTEM FOR ADDITIVE MANUFACTURING

CROSS-REFERENCE TO RELATED APPLICATIONS

This application is a U.S. National Stage application under 35 U.S.C. § 371 of International Application PCT/EP2021/082278 (published as WO 2022/106608 A1), filed Nov. 19, 2021, which claims the benefit of priority to Application EP 20209026.2, filed Nov. 20, 2020. Benefit of the filing date of these prior applications is hereby claimed. Each of these prior applications is hereby incorporated by reference in its entirety.

FIELD OF THE INVENTION

The invention relates to a method and system for controlling an extrusion system for additive manufacturing. The invention further relates to an extrusion system arranged for manufacturing a three-dimensional structure. Furthermore, the invention relates to a computer program product. Further, the invention relates to a use of an extrusion system for additive manufacturing.

BACKGROUND TO THE INVENTION

Additive manufacturing is currently widely used and various techniques exist. Additive manufacturing is a suitable technique for building a structure layer-by-layer and the manufactured structure can be employed in various applications.

Extrusion-based additive manufacturing methods have been employed for fabrication of three-dimensional structures. Such methods can facilitate the production of complex porous structures. Examples of extrusion-based techniques are 3D micro extrusion, robocasting, fused filament fabrication, etc. A material (e.g. a viscous paste, a meltable polymer, a hydrogel, etc.) can be extruded through a nozzle in the form of filaments. A certain arrangement of filaments can be obtained by relative movement of the nozzle with respect to a print bed during deposition. During the material extrusion, filaments are extruded from a nozzle and positioned relative to one another according to a predetermined pattern providing the desired properties of the manufactured porous structure. The lay-down pattern is determined by the print path and has major impact on the shape and properties of the printed structure. In this way, complex geometries and porous structures can be obtained with a fully interconnected network of internal pores which are accessible from the outside, and which may be required for some applications.

The existing systems and methods can be rather slow and inefficient to implement for mass production of porous structures. There is a need for improving the speed and/or efficiency of the printing process of porous structures manufactured by an extrusion based printing process. It is desired to obtain a system capable of increasing the speed with which 3D structures can be printed and/or the productivity without significantly increasing costs and ecologic footprint.

SUMMARY OF THE INVENTION

It is an object of the invention to provide for a method and a system that obviates at least one of the above mentioned drawbacks.

Additionally or alternatively, it is an object of the invention to improve controlling extrusion based additive manufacturing processes.

Additionally or alternatively, it is an object of the invention to increase the efficiency of extrusion based 3D printing of structures.

Additionally or alternatively, it is an object of the invention to improve the productivity of extrusion based 3D printing.

Thereto, the invention provides for a method for controlling an extrusion system for additive manufacturing, the extrusion system being configured to perform at least one print job in which a three-dimensional structure is manufactured in parallel, wherein the extrusion system includes a controller and an extrusion unit having a plurality of nozzle heads by means of which filaments of build material are deposited in a predetermined interconnected arrangement for concurrently forming individual three-dimensional structures in parallel, wherein each nozzle head includes one or more nozzle outlets through which the build material is extruded, wherein the method includes monitoring an operation of each of the plurality of nozzle heads during the print job in order to detect one or more operational failure events linked to one or more failing nozzle heads, wherein, in case one or more operational failure events are detected, the controller is configured to perform the steps of: determining a first value indicative of an average print time for finishing a number of three-dimensional structures when the print job is continued using one or more non-failing nozzle heads of the plurality of nozzle heads which are still operational, determining a second value indicative of an average print time for finishing the number of three-dimensional structures when the print job is promptly interrupted and a new print job is initiated with the one or more failing nozzle heads of the plurality of nozzles heads being repaired, and restarting the print job with the one or more failing nozzle heads being repaired, when the second value is smaller than the first value.

Advantageously, the method effectively increases the productivity of additive manufacturing processes by actively taking into account operational failure events linked to particular nozzles during the print job. The efficiency of the extrusion based parallel 3D printing process can be significantly increased, especially when a large number of structures are manufactured in parallel. Various extrusion based additive manufacturing processes may be used. The invention enables a better control and steering of the printing process, which can significantly increase, or even maximize, the achieved productivity.

In order to increase productivity obtained by means of the extrusion based 3D-printing process, a plurality of printing nozzles can be employed for printing a plurality of structures in parallel. One or more individual nozzles may grouped together and dedicated to printing an individual structure or part to be manufactured. Various configurations can be employed. In a situation of a paste with ideal rheology and/or homogeneity of the feedstock this may boost the printing process by multiplying the output by the amount of nozzles or orifices used per printed structure. However, in practical situations, various errors in the printing process can occur, occasionally and sometimes even rather frequently. The errors may highly depend on the employed configurations of the additive manufacturing system and/or material properties of the build material. A large number of errors are caused by the used feedstock, such as: inhomogeneity in the build material (e.g. paste or extruded filament), non-constant rheology of paste, non-constant and/or non-uniform composition of feedstock, particle in feedstock clogging the nozzle, dirt on the nozzle, density fluctuations in the feedstock, gas (e.g. air bubble) in the feedstock or build material, etc.

In order to monitor the performance of the printing process and detect such errors, the printing process can be monitored by means of a monitoring unit. The monitoring unit may for instance include one or more sensors and/or integrated monitoring arrangements. For example, one or more sensors may be arranged to detect a value indicative of the flow of build material extruded through the nozzle. Additionally or alternatively, it is also possible for instance to use one or more sensors being configured to monitor a value indicative of the extrusion force needed for extruding the build material. Various sensor types and/or monitoring arrangements can be used to track values which can be used to detect errors or malfunctions of components of the additive manufacturing system. It is also possible that the sensors or monitoring arrangements are configured to identify events which tend to be indicative for an error or malfunction (e.g. hardware failure). Such sensors (or monitoring arrangements) may be used to track errors at the level of the individual nozzles being used for parallel printing structures. Additionally or alternatively, it is also envisaged that the monitoring unit comprises a camera system using images to monitor extruded build material. Based on the images it can also be determined whether the nozzles are operating under normal circumstances. The obtained images may be processed and/or analyzed. It is also envisaged that statistical models such as a trained machine learning model is employed for analyzing the captured images in order to identify errors based on images.

The method enables an automated feedback loop which evaluates at least one detected error event and based on that decides whether to continue the printing process or, alternatively, restart the printing process before the printing process is finished (i.e. interrupt the current printing process, carry out needed repairs of the one or more failing nozzles, and restart a new printing process). Furthermore, the controller can also take into account the nature/impact of the error and the probabilities of errors which may occur in the future, based on a statistical model.

As a result, the controller may better control the printing process in order to increase the achieved productivity of parallel additive manufacturing using the plurality of nozzles. Instead of relying on decisions of an operator opinion, which can be biased, the method may employ an objective analysis in order to increase the achievable productivity even when one or more nozzles fail during the printing process. Moreover, the judgement of the operator can become more unreliable as the complexity of the system has increased, for example when using a large number of nozzles (e.g. larger than three nozzles, even more if larger than four nozzles, and even more if larger than five nozzles). For example, if the printer is equipped with 20 nozzles for parallel printing structures, wherein one of the nozzles becomes blocked (i.e. operationally failing) at 35% of the print, it can become very difficult to have a correct judgment even if the operator is very experienced. Another example is, the printer is equipped with three nozzles, and a single nozzle becomes blocked when the print process is finished for 45%. The invention enables a better way to objectively handle such situations and better control the parallel printing process.

Optionally, the first value and second value are calculated using a statistical model.

The statistical model can effectively take into account statistical data relating to operational failure events. Advantageously, the statistical model can be tailored for particular configurations and set-ups of the extrusion based additive manufacturing system (e.g. type of nozzles, configuration of nozzles, type of build material, other hardware configurations, etc.).

Optionally, the statistical model is configured to take into account a probability of operational failure events occurring.

The error probability may be a frequency with which the printing with the nozzle or printing system will lead to an error. A distinction may be made between different types of errors. In some examples, the error probability may be indicative of a rate of occurrence of an error in a hypothetical infinite repetition of the procedure. The probability may be determined based on statistical modeling and/or historic data. The statistical model may be tuned to minimize a difference between observed and predicted errors.

Optionally, the first average print time and the second average print time are calculated based on a predefined probability of an operational failure event occurring per time unit.

The predefined probability of an operational failure event occurring per time unit can be preset in the statistical model. It can be considered as an important parameter. An accurate selection of the predefined probability function may result in a more accurate statistical model, such that the achievable productivity can be increased.

Optionally, the predefined probability per time unit is constant.

In this way, a simplified model can be obtained allowing easy tuning when for example different configurations are employed. For example, in a different parameter, the controller may be easily adjusted to take into account for example the different number of nozzles, types of nozzles, build material, etc.

Optionally, the predefined probability per time unit is variable.

The error rate can be constant, however, the accuracy of the model can be increased significantly by employing a variable probability per time unit. In various examples, such variable predefined probability of time will result in significantly better results. For example, if an error occurs, the chance for another error occurring may be higher in the first period after the error before returning to a default rate. The variable probability per time unit can take this into account.

Optionally, the predefined probability per time unit is variable in function of elapsed time since a start of the print job.

The accuracy may be further increased by making the predefined probability per time unit dependent on the elapsed time at least during a time period of the printing process (for example a time period at the start of the printing process). For example, during the start-up phase of the print process, the error rate can be higher. By taking this into account, it can be better determined when the printing process has to be restarted if one or more error events have been detected, which can effectively result in significantly higher productivity.

Optionally, the predefined probability per time unit is variable in function of types of error events.

A first type of error event may occur more often than a second type of error. Advantageously, the statistical model may be configured to take this into account.

Optionally, the predefined probability per time unit is variable in function of a percentage of completion of the print job.

Optionally, the predefined probability per time unit is variable in function of an amount of build material already extruded by the plurality of nozzle heads.

The error probability may depend on the amount of build material which has been already extruded. For instance, in some examples, the probability per time unit may be higher when the build material reservoir is almost empty. Additionally or alternatively, in some examples, the probability per time unit is higher when the build material reservoir is full or almost full. The accuracy of the prediction can be improved by taking the amount of build material already extruded and/or the remaining build material reservoir into account.

Optionally, the predefined probability per time unit is variable in function of previously detected error events during the print job.

If one error event has actually been detected, this may influence the predefined probability per time unit. For example, one type of error, may increase the probability of another error occurring subsequently. By taking this into account, the accuracy of the predictions can be increased significantly, which may result in an overall better achievable productivity.

Optionally, the extrusion unit includes more than two nozzle heads, preferably more than five nozzle heads, even more preferably more than ten nozzle heads.

Having more nozzles may result in more complex systems, which can be handled adequately by means of the method according to the invention. The restarting of the printing process as a result of failure events can be better controlled in order to achieve higher productivity.

Optionally, failure of one nozzle renders at least one other nozzles non-operational, which is automatically taken into account by the controller.

Optionally, the first value and the second value are at least partially calculated by means of a trained machine learning model.

The trained machine learning model may for instance include at least one artificial neural network. However, other machine learning models may also be employed.

Various subsystems and/or sensor units may be used for monitoring whether hardware errors/failures have occurred during the print job. The controller may identify at what time an error event has been registered. The controller may be configured to (periodically) calculate how much time is needed to finish the number of structures in case of continuing the print job without interruption and restarting, and in case of interrupting and restarting the print job (i.e. reset) in order to repair the one or more failing nozzles. Based on the results of the calculations, the controller can determine whether it is more advantageous for the productivity to restart/reset the print job.

It will be appreciated that in some cases, the automatic monitoring can be translated or converted to pre-programmed procedures. In this way, conditional program steps can be followed which take into account the probability of errors or failures per time unit. In some cases, this may further simplify the controller.

According to an aspect, the invention provides for an extrusion system arranged for manufacturing a three-dimensional structure, wherein the extrusion system is configured to perform at least one print job in which a three-dimensional structure is manufactured in parallel, the system comprising: a controller, an extrusion unit comprising a plurality of nozzle heads by means of which filaments of build material are deposited in a predetermined interconnected arrangement such as to concurrently form individual three-dimensional structures in parallel, wherein each nozzle head includes one or more nozzle outlets through which the build material is extruded, and a monitoring unit configured to monitor an operation of each of the plurality of nozzle heads during the print job in order to detect one or more operational failure events linked to one or more failing nozzle heads, wherein, in case one or more operational failure events are detected by means of the monitoring unit, the controller is configured to: determine a first value indicative of an average print time for finishing a number of three-dimensional structures in case the print job is continued using one or more non-failing nozzle heads of the plurality of nozzle heads which are still operational, determine a second value indicative of an average print time for finishing the number of three-dimensional structures in case the print job is promptly interrupted and a new print job is initiated with the one or more failing nozzle heads of the plurality of nozzles heads being repaired, and restart the print job with the one or more failing nozzle heads being repaired, when the second average print time is smaller than the first average print time.

Advantageously, the system enables increasing the productivity obtained by means of extrusion based additive manufacturing in which a number of distinct nozzles are arranged for example next to each other for simultaneously printing a plurality of porous structures in parallel. At least one nozzle may be dedicated for printing a single structure (e.g. one or more nozzles per structure to be printed in parallel).

Optionally, the controller may be configured to calculate estimated print times needed for finishing a print job, for different scenarios. The estimated print times for finishing the print job in the different scenarios may be compared to each other in order to determine whether a restart is required in order to minimize the total time needed for finishing the print job. The controller may thus determine a moment in which a restart is to be initiated if that would likely provide a reduced total print time.

For instance, in a first scenario the controller may estimate the total print time required for manufacturing the number of three-dimensional structures in case the print process is continued with the one or more failed nozzle heads and the one or more failing nozzle heads are replaced once the structure being printed in the current printing print job are finished, such that the next print job can be started with the one or more failing nozzle heads in the previous print job being repaired. For instance, in a second scenario, the controller may estimate the total print time required for manufacturing the number of three-dimensional structures in case the print process is interrupted and the one or more failed nozzle heads are repaired (e.g. replaced) and the print job is restarted with repaired nozzle heads. In the first scenario, the average time to print the structure may depend on the time needed to print the structure, and the nozzle being available.

The probability may be chosen such as to take into account that if an error has occurred, then the chance that another error will subsequently occur can be higher, at least for a certain period of time after the first error has occurred. In some examples the probability of errors occurring in the future may be function of time and whether an error has already occurred at a certain time step.

For example, when a new print job is started, there may initially be a greater chance of errors. Additionally or alternatively, if an error has occurred, a period after the error may have a higher chance of a new error occurring. In some cases, a first error at a first location is coupled to a subsequent second error at a second location, the second location being different than the first location. The first location may for instance be at a first nozzle head and the second location at a (different) second nozzle head.

The probability may be function of other parameters, such as for instance at least one of a type of build material used, properties of the build material, the size of the reservoir, configurations and/or dimensions of the nozzles, etc. For example, a first build material paste may result in a higher probability of an error occurring compared to a second build material paste.

For instance, in a simple case in which only two nozzles are used for parallel printing porous structures, it may be determined based on the predefined probability that if over 50% of the print job has been finished, it may be better to continue printing and finish the current print job in case one of the two nozzles fails. If the print job has not yet finished 50% of the total print process, then the controller may be configured to interrupt the current print job, followed by a repair procedure and restarting the print job.

According to an aspect, the invention provides for a computer program product configured for performing, when run on a controller of an extrusion system with an extrusion unit including a plurality of nozzle heads each having one or more nozzle outlets, the steps of the method according to the invention.

According to an aspect, the invention provides for a medium including instructions which a controller of an extrusion based additive manufacturing system can interpret for carrying out method steps according to the invention.

According to an aspect, the invention provides for a use of the extrusion system for additive manufacturing according to the invention for manufacturing three-dimensional structures in parallel.

The invention allows better handling failing hardware events or nozzles in order to effectively increase the productivity of the printing process. Advantageously, the invention enables increasing the productivity, even taking into account different configurations (e.g. different number of nozzles, etc.).

Various system configurations are possible. In some cases, the configurations, for instance relating to the total number of nozzles being operational, can change when a new printing campaign is started. It is even possible that the configurations are changed during printing campaigns (for instance when the next print job is started). The claimed invention can easily take into account changing conditions and enable higher productivity for all kinds of configurations.

It will be appreciated that any of the aspects, features and options described in view of the method apply equally to the system and the described extrusion system, computer program product and use. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 1 shows a schematic diagram of a system;

FIG. 2 shows a schematic diagram of nozzle arrangements;

DETAILED DESCRIPTION

Figure 3:
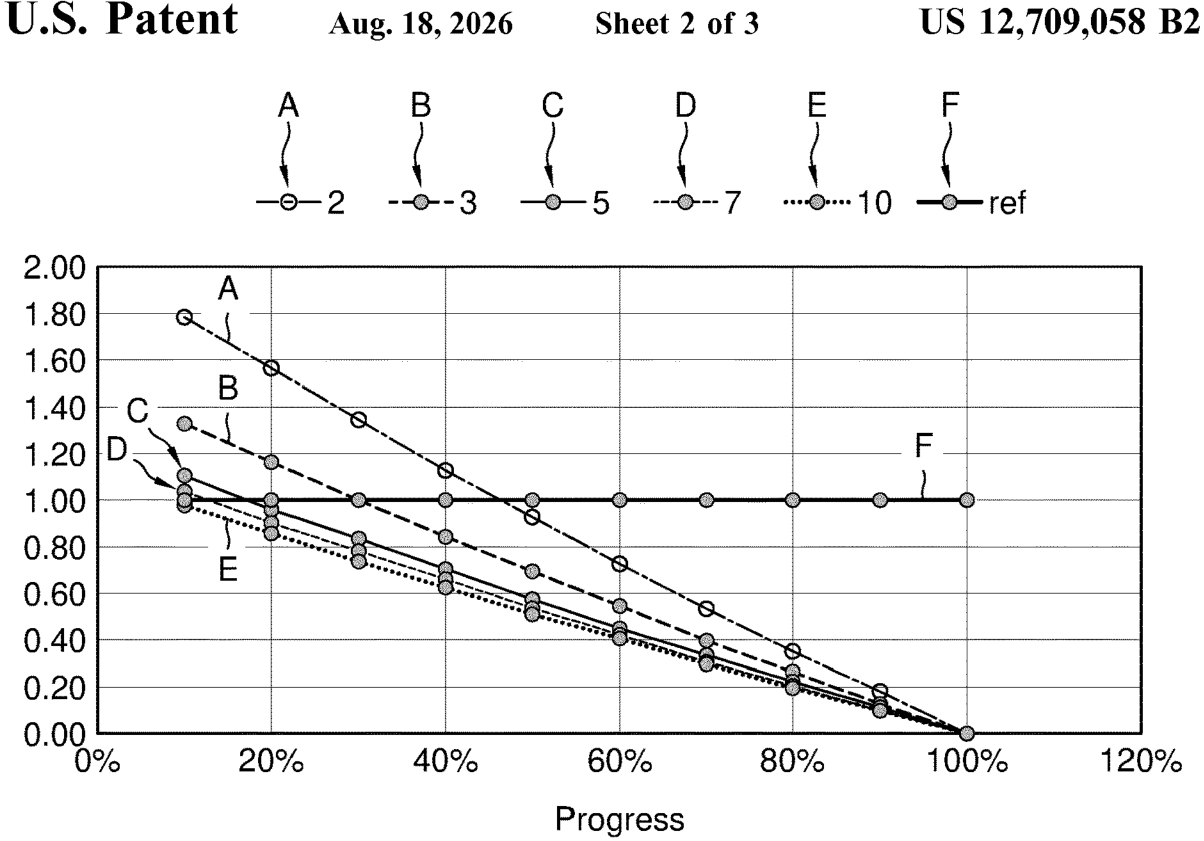
FIG. 3 shows a schematic diagram of an exemplary graph.

FIG. 1 shows a schematic diagram of a system 1. The system 1 is an extrusion system 1 arranged for manufacturing a three-dimensional structure 3, wherein the extrusion system 1 is configured to perform at least one print job in which the three-dimensional structure 3 is manufactured in parallel. The system 1 comprises a controller (not shown). The controller may be integrated in a printing device 1*a* of the system 1 or may be at a remote location in communication with the printing device 1*a*. It is also envisaged that a plurality of controllers are used which may for instance communicate with each other. The system 1 further includes an extrusion unit 5 comprising a plurality of nozzle heads 7 by means of which filaments of build material are deposited in a predetermined interconnected arrangement such as to concurrently form individual three-dimensional structures 3 in parallel, wherein each nozzle head 7 includes one or more nozzle outlets 9 through which the build material is extruded. In this example, each nozzle head 7 includes a single nozzle or nozzle outlet 9. However, it is also envisaged that more than one nozzles or nozzle outlets are provided for each nozzle head 7. The system 1 further has a monitoring unit (not shown) configured to monitor an operation of each of the plurality of nozzle heads 7 during the print job in order to detect one or more operational failure events linked to one or more failing nozzle heads 7. It is also envisaged that operational failure events linked to one or more of the nozzle outlets 9 or nozzles of the nozzle head 7 are detected. In case one or more operational failure events are detected by means of the monitoring unit, the controller is configured to: determine a first value indicative of an average print time for finishing a number of three-dimensional structures in case the print job is continued using one or more non-failing nozzle heads of the plurality of nozzle heads which are still operational, determine a second value indicative of an average print time for finishing the number of three-dimensional structures in case the print job is promptly interrupted and a new print job is initiated with the one or more failing nozzle heads of the plurality of nozzles heads being repaired, and restart the print job with the one or more failing nozzle heads being repaired, when the second average print time is smaller than the first average print time.

During a print job, one or more nozzles may operationally fail, resulting in less structures being produced in parallel as a result. The failure of the nozzles may be the result of various kind of errors. A failed nozzle may require a repair or even a replacement. Instead of simply continuing the print job with the failed nozzles, resulting in less productivity and wasted time as a result of the nozzle failure(s), the system enables a better handling of such situations. The invention increases the productivity by better taking into account failing nozzles for all kind of extrusion based additive manufacturing configurations (e.g. number of nozzles used, type of build material, etc.).

Various printing systems 1 can be used. In this exemplary embodiments, a plurality of three-dimensional porous structures 3 are manufactured in parallel next to each other, using a subset of nozzles for each porous structure. The subset includes one nozzle. However, the subset may include more nozzles, e.g. two nozzles, three nozzles, five nozzles, etc. Each subset of nozzles may thus include at least one nozzle, wherein each subset of nozzles carries out a corresponding relative movement for deposition of the filaments.

FIG. 2 shows a schematic diagram of nozzle arrangements. The neighboring nozzles are distanced in order to provide a working area on which the relevant porous structure of the plurality of porous structures is manufactured. Optionally, all the produced porous structure have a same design. In order to increase productivity, the amount of nozzles per platform can be increased. A platform may be used which is arranged to extrude filaments through at least two nozzles 9. The nozzles 9 could be aligned in a line or in three dimensions. The different nozzles 9 can be arranged to each print an individual porous structure 3. Therefore the distance between the nozzle heads can be larger than the maximal length in the direction where the nozzles are oriented.

The build material (e.g. paste) extruded through the nozzles 9 can come from at least one of a common reservoir for all nozzles 9, a part reservoir feeding part of the nozzles or a single paste reservoir for each nozzle. The build material can be fed to the nozzle using air pressure, a piston pump, or a screw. Other techniques may also be used. The build material can come from a reservoir with fixed volume or constantly be fed with for example a twin screw extruder. The build material volume extruded through each nozzle can be a fixed flow for all nozzles or different flow for each nozzles 9. In some examples, the build material rheology of the build material flowing through each nozzle can be identical. For example, each nozzle 9 can extrude an identical paste in rheology and composition or a different paste. In some examples, the build material flow for nozzles with different build material can be adjusted separately.

Advantageously, the manufacturing process can be faster due to more nozzles and lower cost due to the use of 1 XYZ table/programming unit. If a single nozzle goes into error (blockage, more paste deposition, . . . ) all other samples are not affected. Advantageously, the invention enables an intelligent control of interruption of the additive manufacturing process when one or more failures occur, thereby enabling increasing the overall productivity of structures being manufactured.

The controller may be configured to calculate how much time is needed on average to print structures for at least two scenarios, wherein in one scenario the printing job is continued with one or more failing nozzles, and in another scenario the printing job is halted and restarted with the failing nozzles being repaired. Such a comparison may enable the controller to significantly increase the productivity. As the average number of structures being manufactured per unit of time can be increased, also taking into account the probabilities of nozzles failing.

The nozzles are arranged next to each other in FIG. 2A, and in a matrix (i.e. 2 dimensional array) in FIG. 2B. Other nozzle arrangements are also possible. In some examples, the interspace between the nozzles can be changed, such that the area of the working area 11 can be changed. This may be done depending on the porous structure(s) to be manufactured. Optionally, the controller first determines the size of the porous structure to be manufactured, and subsequently adjusts the interspacing between the nozzles such as to obtain a size of a working area 11 based on the size of the porous structure to be manufactured. In this way, a more efficient use of the available space can be used. This interspace may also effect the probability of an error per time unit. In some examples, the controller also takes into account each reconfiguration in order to adjust the probability of error per time unit based thereon.

Various elements may result in errors/failures. For example, a non-constant rheology may result in a failure of the extrusion nozzle. In some examples, the controller may be configured to first try to correct the error (e.g. providing a higher pressure to resolve a blockage issue at the nozzle outlet), prior to evaluate whether a reset is necessary to increase the overall (estimated) productivity. It is also envisaged that the controller may be configured to attempt to correct errors prior to take into account the error in assessing whether the interruption is needed.

FIG. 3 shows an exemplary graph obtained by means of a statistical model. The horizontal axis corresponds to the percentage printed. The vertical axis corresponds to the ratio between continuing printing and restarting printing, i.e. values above 1 imply that interrupting and restarting the print job (with a failing nozzle repaired) is preferred, and values below 1 imply that continuing the print job with a failing nozzle is preferred.

The operation of each of nozzles can be monitored in order to detect failures. If an irreversible error has occurred resulting in failed printing of the structure being printed by the relevant failing nozzle, it can be evaluated whether it is interesting to continue the printing job or interrupt directly and restart the printing job (in which case the already printed portions of the structures in the current print job may be lost). In this way, the controller may be configured to periodically assess whether to continue the print job once a failure of one of the nozzles is detected.

Below a simplified statistical model is given as an example.

In a first scenario in which the printing is continued the following equation is obtained:

$$T_{scen\ 1} = \frac{T_0}{n*(1-pT_0)}$$

In the equation, $T_0$ is the time of the print job (time required to finish the print job), p is the probability of an error occurring per time unit, n is the total number of nozzles used during the print job, and $T_{restart}$ is the time required for resetting/restarting (restart time may depend on the type of error). Furthermore, the term p is indicative of an error per second. For example, an error may statistically occur every d period of time (e.g. d=1000 seconds). In such a case, this error rate may be constant. However, it is also possible that p is function of different parameters (i.e. non-constant). Advantageously, more accurate print time estimations can be determined when P is variable.

In a second scenario in which an interruption is initiated upon detection of an error the following equation is obtained:

$$T_{scen\ 2} = \frac{T_0}{n} + \frac{T_0/2}{n} * \frac{1-(1-pT_0)^n}{(1-pT_0)^n}$$

It is possible to select the best scenario upon detection of an error by using the following equation:

$$T_{scen\ 3} = \int_x^{T_0} \frac{dT_{scen1}}{dt} + \int_0^x \frac{dT_{scen2}}{dt}$$

with t<x: restarting the printing process results in higher productivity t>x: continuing the printing process results in higher productivity In the above equation, x may depend on $T_0$, the probability of error per time unit and the total number of nozzles. The number of structures printed after $T_0$ for the two above scenarios may be calculated by means of the following equations:

$$T_{scen\ 1} = \frac{T_0}{(n-1)*(1-p(T_0-t))}$$

$$T_{scen\ 2} = t + T_{scen\ 3}$$

In the above simplified exemplary model and the results shown in FIG. 3, the probability of error per time unit (cf. error rate) is considered to be constant. However, the model can be made more accurate when the probability of error per time unit is function of other parameters. The graph shown in FIG. 3 is obtained with an exemplary probability of error per time unit of 0.001 error $s^{-1}$. In this example, the total required time to finish printing of the 3D structure was set to 150 s (total print time per parallel printing batch).

With 2 nozzles, if over 50% when printing with these parameters, it is better to continue printing; if not yet at 50% it is better to restart for maximum productivity. With 3 nozzles, the intersection is at 18 percent. With even more nozzles it is more interesting to continue printing.

Figure 4:
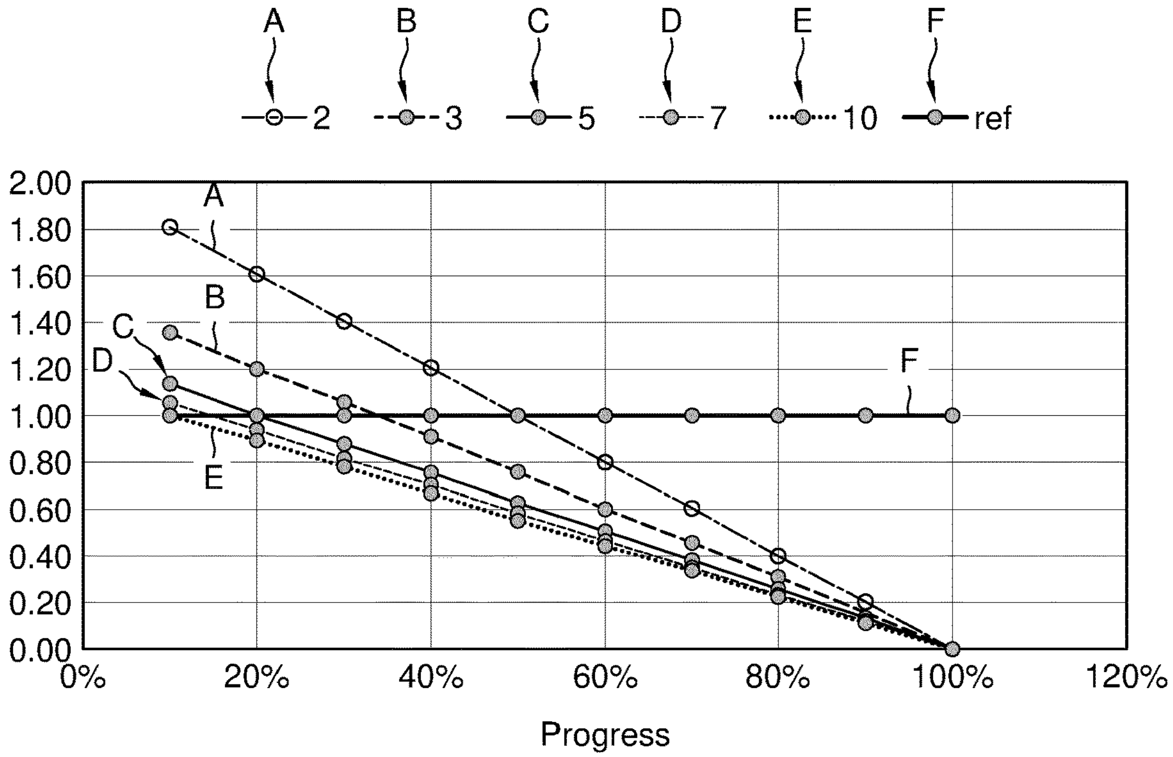
FIG. 4 shows a schematic diagram of an exemplary graph.

FIG. 4 shows a schematic diagram of an exemplary graph. The same exemplary statistical model as described above for FIG. 3 is used. However, in this example, the total time to print the 3D structure was 26 seconds, and the error rate (cf. probability of error per time unit) was set to 0.00006 error $s^{-1}$. This example has significantly lower frequency of errors compared to the example described in FIG. 3. It is seen that continuing printing is more beneficial in most cases with multiple nozzles. Although restarting becomes more favorable in the case with 2 nozzles and lower than 50% progress and the case with 3 nozzles and lower than 33% progress. Compared to the example described in FIG. 3, the restarting is more beneficial when the error rate is lower. Advantageously, the method and system according to the invention allows to accurately taking various configuration parameters into account and controlling the interruption and restarting of the printing process such as to increase the achievable productivity.

The predefined probability is a constant function in this example. However, it is also envisaged that the predefined probability is a function dependent on at least on parameter (e.g. time), allowing more sophisticated estimations of errors occurring. In this way, the controller can better control the printing operation for increasing the productivity even when errors have occurred.

Advantageously, a higher productivity can be obtained since the controller can better handle situations in which one or more nozzles of the plurality of nozzles used for parallel printing fail. Making a failing nozzle operational again may require some time. This may be a manual process for example (e.g. switching a failing nozzle with a non-failing nozzle).

Figure 5:
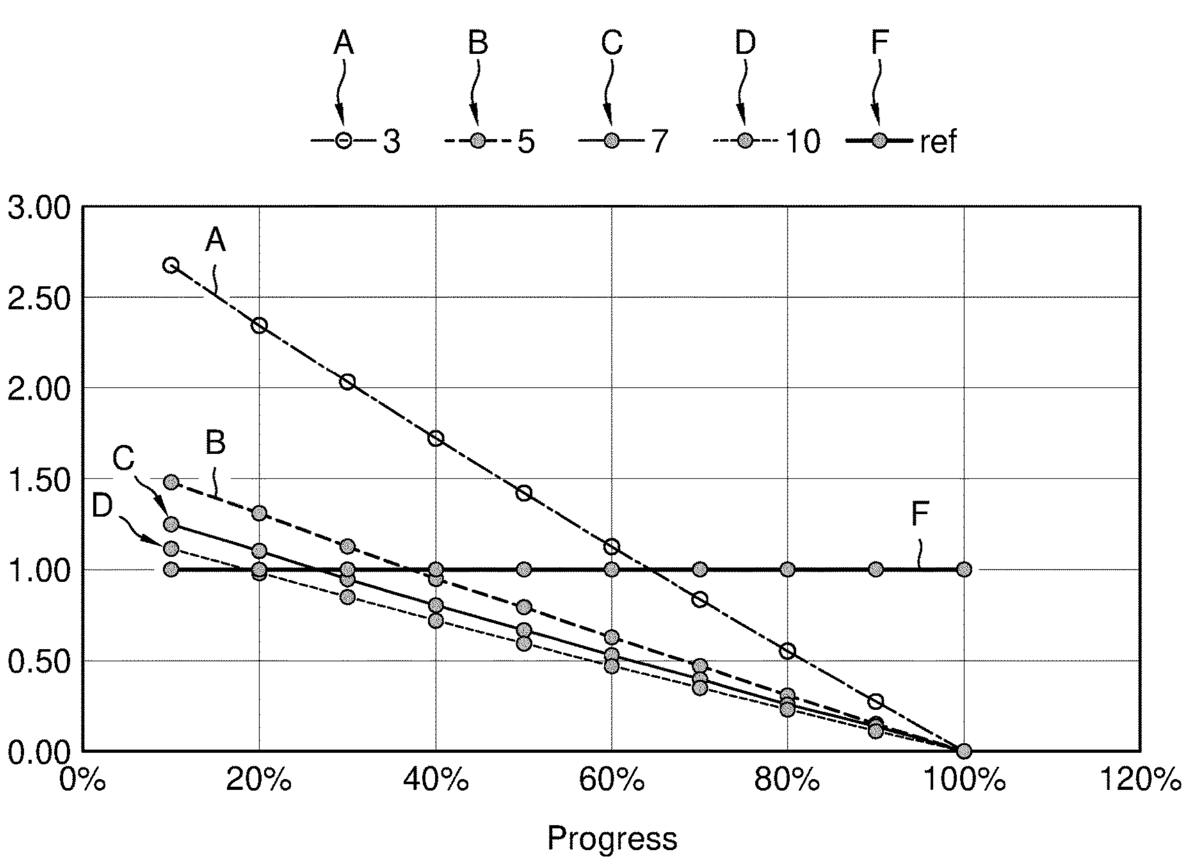
FIG. 5 shows a schematic diagram of an exemplary graph.

FIG. 5 shows a schematic diagram of an exemplary graph. In this example, multiple errors occur during printing. For the sake of simplicity, it is considered that two errors occur during printing. It will be appreciated that the model may be used also to obtain graphs with a different number of errors occurring or being detected.

Figure 6:
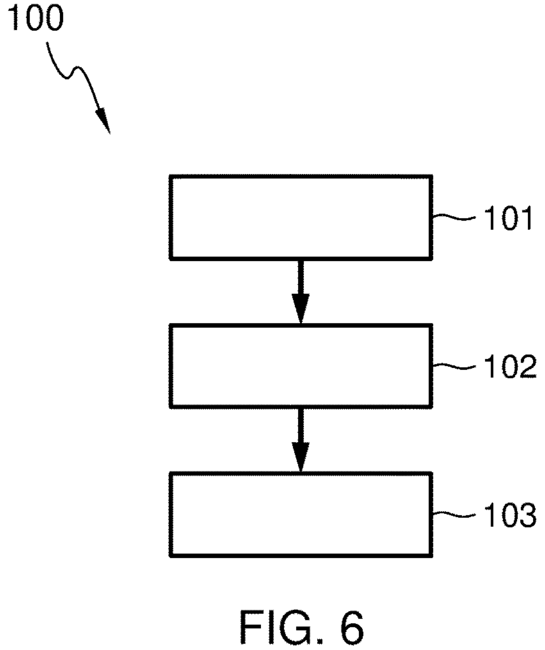
FIG. 6 shows a schematic diagram of a method.

FIG. 6 shows a schematic diagram of a method 100 for controlling an extrusion system for additive manufacturing, the extrusion system being configured to perform at least one print job in which a three-dimensional structure is manufactured in parallel, wherein the extrusion system includes a controller and an extrusion unit having a plurality of nozzle heads by means of which filaments of build material are deposited in a predetermined interconnected arrangement for concurrently forming individual three-dimensional structures in parallel, wherein each nozzle head includes one or more nozzle outlets through which the build material is extruded, wherein the method includes monitoring an operation of each of the plurality of nozzle heads during the print job in order to detect one or more operational failure events linked to one or more failing nozzle heads, wherein, in case one or more operational failure events are detected, the controller is configured to perform the steps of: determining a first value indicative of an average print time for finishing a number of three-dimensional structures when the print job is continued using one or more non-failing nozzle heads of the plurality of nozzle heads which are still operational (101); determining a second value indicative of an average print time for finishing the number of three-dimensional structures when the print job is promptly interrupted and a new print job is initiated with the one or more failing nozzle heads of the plurality of nozzles heads being repaired (102); and restarting the print job with the one or more failing nozzle heads being repaired, when the second value is smaller than the first value (103).

Advantageously, the controller can effectively decide whether to continue the print job or reset the print job in case at least one nozzle fails.

The method may be used for increasing the productivity of a 3D micro-extrusion equipment using a printing head with multiple orifices based on failure rate statistics. Various extrusion based additive manufacturing systems may be used, for example comprising an arrangement configured for micro-extrusion of build material (e.g. pastes) comprising multiple orifices or nozzles (e.g. printing on XYZ table). In some examples, each orifice may result in a separate structure with all structures having the same designs. The paste can be extruded from a single reservoir or of multiple reservoirs. The paste flow can be either the same for all orifices or individually adjusted. Advantageously, the invention provides for a decision system to stop and restart or to continue printing based at least on failure statistics. Consequently, the productivity can be significantly enhanced in an advantageous way.

Various statistical models can be used. Below an exemplary model is derived for calculating different scenarios.

Scenario 1 (Continue Printing)

n nozzles

Number of structures printed=probability of n nozzles being successful (non-failing) multiplied by n nozzles+probability of (n−1) nozzles being successful (non-failing) multiplied by (n−1) nozzles+ . . .

For example, for three nozzles, the number of structures at $T_0$ can be calculated:

$$3*(1-pT_0)\hat{}3*1+2*(1-pT_0)\hat{}2*pT_0*3+$$

$$1*(1-pT_0)\hat{}1*(pT_0)\hat{}2*3+0*(1-pT_0)\hat{}0*(pT_0)\hat{}3*1=$$

-continued $$3-9pT_0+9(pT_0){}^\wedge 2-3(pT_0){}^\wedge 3+6\ pT_0-12(pT_0){}^\wedge 2+$$
$$6(pT_0){}^\wedge 3+3(pT_0){}^\wedge 2-3(pT_0){}^\wedge 3+0=3-3\ pT_0=\Big(3(1-pT_0)$$

Time for one structure =

$$T_{scen\ 1}=\frac{T_0}{n*(1-pT_0)}\text{ with } n=3$$

For $n$ nozzles $pT_0=x$:

$$n*(1-x)^n*1+(n-1)*(1-x)^{n-1}*x*\frac{n!}{1!*(n-1)!}+$$
$$(n-2)*(1-x)^{n-2}*x^2*\frac{n!}{2!*(n-2)!}+$$
$$1*(1-x)^1*x^{n-1}*\frac{n!}{(n-1)!*(n-(n-1))!}+0*pT_0^0*(1-pT_0)^n=$$
$$n*\left(1-nx+\frac{n(n-1)}{2!}*x^2-\frac{n(n-1)(n-2)}{3!}*x^3+\cdots\right)+(n-1)*$$
$$\frac{n!}{1!*(n-1)!}*\left(x-(n-1)x^2+\frac{(n-1)(n-2)}{2!}*x^3-\frac{(n-1)(n-2)(n-3)}{3!}*\right.$$
$$\left.x^4+\cdots\right)+\ldots+1*\frac{n!}{(n-1)!*(n-(n-1))!}*\left(x^{n-1}-x^n\right)$$

$$\text{All terms in } x{}^\wedge n=n*\frac{n!}{n!}-(n-1)*\frac{n!}{1!*(n-1)!}*\frac{(n-1)!}{(n-1)!}+$$
$$(n-2)*\frac{n!}{2!*(n-2)!}*\frac{(n-2)!}{(n-2)!}-\cdots-1*\frac{n!}{(n-1)!*1!}=$$
$$\frac{n!}{(n-1)!}-\frac{n!}{1!*(n-1)!}+\frac{n!}{2!*(n-3)!}-\cdots-\frac{n!}{(n-1)!*(n-(n-1))!}$$

$n$ = even (eerste en laatste factor combineren, voorlaatste en tweede, ...) =

$$\frac{n!}{(n-1)!}-\frac{n!}{(n-1)!*1!}-\frac{n!}{1!*(n-2)!}+\frac{2*n!}{(n-2)!*(n-(n-2))!}+\cdots=0$$

n=uneven: sum of all positive terms (1; 3; 5; . . . ) is equal to the sum of all negative terms (2; 4; 6; . . . )

terms in x^1

$$=n*(-n)+(n-1)*n=-n$$

Terms in x^0

$$=n$$

Hence, structures $T=T_0$ $$=n-nx=n(1-pT_0)$$

Hence, time for one structure:

$$T=\frac{T_0}{n(1-pT_0)}$$

Scenario 2 (Always Restarting Print Process when an Error is Detected):

Time loss as a result of error=$T_0/2$ since errors occur randomly (assumption)

The number of structures (only n structures if no error in all of the n nozzles)

$$n*(1-pT_0)^n$$

Time

-continued $$(1-pT_0)^n*T_0+\frac{T_0}{2}(1-(1-pT_0)^n)$$

Time for one structure $$T_{scen\ 2}=\frac{T_0}{2}+\frac{T_0/2}{n}*\frac{1-(1-pT_0)^n}{(1-pT_0)^n}$$

Scenario 3 (Chose the Best Scenario when an Error has been Detected)

$$T_{scen\ 3}=\int_x^{T_0}\frac{dT_{scen1}}{dt}+\int_0^x\frac{dT_{scen2}}{dt}$$

t<x: restarting printing process is more advantageous and will result in shorter print time t>x: continuing printing process results in shortest print time It will be appreciated that the above is a simplified exemplary model. However, other models are also envisaged for instance taking other aspects and parameters into account. The probability of error per time unit (cf. error rate) may be considered as function of various parameters. For example, in some cases, the probability of errors occurring depends on a stage of the printing process. For instance, it is observed that ram extruders (using ram or plunger for achieving extrusion) may be more prone to errors at a start-up of a printing process. Such dependency on the process stage may be less pronounced for needle-valve extruders.

Different types of extrusion additive manufacturing arrangements can be employed, for example filament-fed extrusion, screw extrusion or a syringe extrusion. A combination of these technologies is also possible.

In syringe extruders material can be placed into a syringe and the printer can depress the plunger at a controlled rate to extrude filaments through a nozzle. The syringes may for example be filled with a viscous material. In some examples, additionally a heated jacket can be used for heating the syringe to melt the material (e.g. polymer filaments or granules) in situ before printing. Different types of syringe extrusion systems are possible. A pneumatic pressure can be applied to the plunger. Alternatively, the plunger can be depressed by means of a mechanical displacement for instance achieved by means of an electric motor. Mechanical displacement may allow for more direct control over the volumetric extrusion rate whereas in pneumatic printers, the extrusion rate may additionally depend on an interplay between needle geometry, material viscosity, pneumatic pressure, and obstruction by previously extruded filaments. Other alternative designs are also possible.

In screw extruders a material can be fed into a screw that is surrounded by a close-fitting sleeve, called a barrel. As the screw rotates, material can be forced through the nozzle at the end of the barrel. The rate of material extrusion from the nozzle can depend on the screw rotation speed. Screw extruders can accommodate materials in paste form, however, for example polymer granules can also be used.

Filament-fed extruders may use reels of filaments fed into a heated melting chamber which is attached to a nozzle. The rate of material extrusion from the nozzle can depend on the rate at which the filament is fed off the reels into the melting chamber. Additive manufacturing software may control the extrusion rate based on the desired diameter of extruded filaments and the speed at which the nozzle is moving.

Various systems can be used for performing the extrusion based additive manufacturing method according to the invention.

A wide range of materials can be used, with a vast range of properties. Examples are metals, composites, ceramics, polymers, natural materials, etc. Different materials may result in different mechanical properties. Hence, the print path may depend on the specific material used during deposition.

Examples of materials that can be used in the extrusion based additive manufacturing process, include ceramic materials (e.g. alumina, zirconia, silica, silicon carbide, silicon nitride, etc.), composite materials (e.g. polymer ceramic composites), metals (RVS, titanium, copper, aluminum, silver, etc.) zeolites, metal organic frameworks, carbon, graphene etc. Other materials suitable for extrusion based additive manufacturing are also envisaged, such as for instance polymer based materials.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for controlling an extrusion system for additive manufacturing by means of an automated feedback loop that is configured to evaluate at least one detected operational failure event and based on that decide whether to continue the printing process, the extrusion system being configured to perform at least one print job in which a three-dimensional structure is manufactured in parallel, wherein the extrusion system includes a controller and an extrusion unit having a plurality of nozzle heads by means of which filaments of build material are deposited in a predetermined interconnected arrangement for concurrently forming individual three-dimensional structures in parallel, wherein each nozzle head includes one or more nozzle outlets through which the build material is extruded, wherein the method includes monitoring an operation of each of the plurality of nozzle heads during the print job by acquiring sensor data indicative of the operation of the nozzle heads in order to detect one or more operational failure events linked to one or more failing nozzle heads, wherein, in case one or more operational failure events are detected, the controller is configured to perform the steps of:

determining a first value indicative of an average print time for finishing a number of three-dimensional structures when the print job is continued using one or more non-failing nozzle heads of the plurality of nozzle heads which are still operational, determining a second value indicative of an average print time for finishing the number of three-dimensional structures when the print job is promptly interrupted and a new print job is initiated with the one or more failing nozzle heads of the plurality of nozzle heads being repaired, determining that the second value is smaller than the first value;

in response to determining that the second value is smaller than the first value: initiating a repair procedure on the one or more failing nozzle heads, and automatically restarting the print job with the one or more failing nozzle heads being repaired.

2. The method according to claim 1, wherein the first value and second value are calculated using a statistical model.

3. The method according to claim 2, wherein the statistical model is configured to take into account a probability of operational failure events occurring.

4. The method according to claim 1, wherein the first average print time and the second average print time are calculated based on a predefined probability of an operational failure event occurring per time unit.

5. The method according to claim 4, wherein the predefined probability per time unit is constant.

6. The method according to claim 4, wherein the predefined probability per time unit is variable in function of elapsed time since a start of the print job.

7. The method according to claim 4, wherein the predefined probability per time unit is variable in function of types of error events.

8. The method according to claim 4, wherein the predefined probability per time unit is variable in function of a percentage of completion of the print job.

9. The method according to claim 4, wherein the predefined probability per time unit is variable in function of an amount of build material already extruded by the plurality of nozzle heads.

10. The method according to claim 4, wherein the predefined probability per time unit is variable in function of previously detected error events during the print job.

11. The method according to claim 4, wherein the extrusion unit includes more than two nozzle heads.

12. The method according to claim 11, wherein the extrusion unit includes more than five nozzle heads.

13. The method according to claim 12, wherein the extrusion unit includes more than ten nozzle heads.

14. The method according to claim 1, wherein the first value and the second value are at least partially calculated by means of a trained machine learning model.

15. A non-transitory computer-readable medium for performing, when run on a controller of an extrusion system with an extrusion unit including a plurality of nozzle heads each having one or more nozzle outlets, the method according to claim 1.

16. An extrusion system arranged for manufacturing a three-dimensional structure by means of an automated feedback loop that is configured to evaluate at least one detected operational failure event and based on that decide whether to continue the printing process, wherein the extrusion system is configured to perform at least one print job in which a three-dimensional structure is manufactured in parallel, the system comprising:

a controller, an extrusion unit comprising a plurality of nozzle heads by means of which filaments of build material are deposited in a predetermined interconnected arrangement such as to concurrently form individual three-dimensional structures in parallel, wherein each nozzle head includes one or more nozzle outlets through which the build material is extruded, and a monitoring unit configured to monitor an operation of each of the plurality of nozzle heads during the print job by acquiring sensor data indicative of the operation of the nozzle heads in order to detect one or more operational failure events linked to one or more failing nozzle heads, wherein, in case one or more operational failure events are detected by means of the monitoring unit, the controller is configured to:

determine a first value indicative of an average print time for finishing a number of three-dimensional structures in case the print job is continued using one or more non-failing nozzle heads of the plurality of nozzle heads which are still operational, determine a second value indicative of an average print time for finishing the number of three-dimensional structures in case the print job is promptly interrupted and a new print job is initiated with the one or more failing nozzle heads of the plurality of nozzle heads being repaired, determine that the second value is smaller than the first value, in response to determining that the second value is smaller than the first value: initiate a repair procedure on the one or more failing nozzle heads, and automatically restart the print job with the one or more failing nozzle heads being repaired.

17. The extrusion system according to claim 16, wherein the first value and second value are determined using a statistical model configured to take into account a probability of operational failure events occurring, the probability of operational failure events occurring being a predefined probability per time unit.

18. The extrusion system according to claim 17, wherein:

the predefined probability per time unit is constant;

the predefined probability per time unit is variable in function of elapsed time since a start of the print job;

the predefined probability per time unit is variable in function of types of error events;

the predefined probability per time unit is variable in function of a percentage of completion of the print job;

the predefined probability per time unit is variable in function of an amount of build material already extruded by the plurality of nozzle heads; or the predefined probability per time unit is variable in function of previously detected error events during the print job.

19. The extrusion system according to claim 17, wherein the first value and the second value are at least partially calculated by means of a trained machine learning model.

20. A method for additive manufacturing, the method comprising using the extrusion system according to claim 16 for manufacturing three-dimensional structures in parallel.

* * * * *